UNITED STATES PATENT OFFICE.

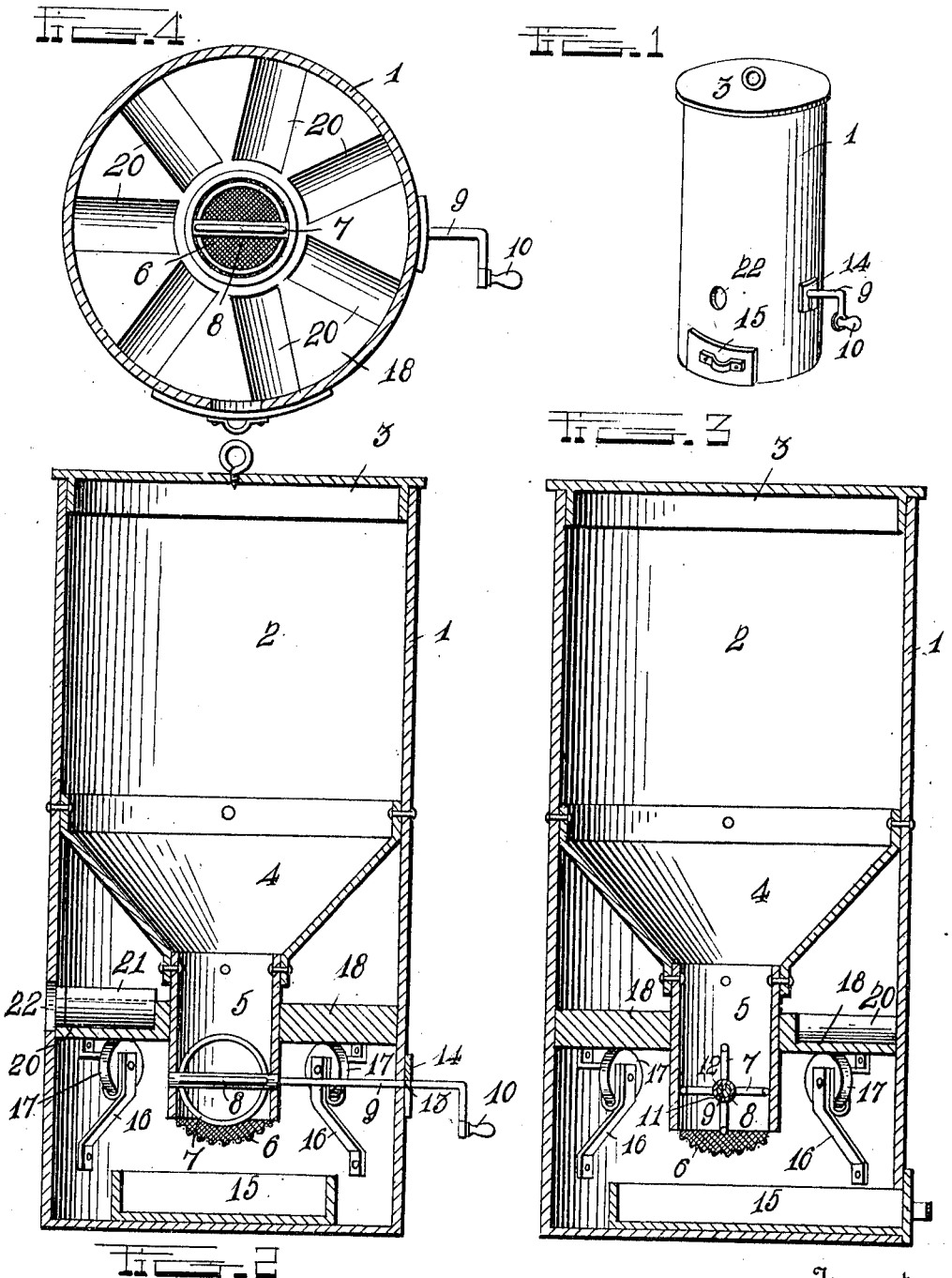

GEORGE W. DRULINER, OF BENKELMAN, NEBRASKA.

KITCHEN-CABINET.

970,025.  Specification of Letters Patent.  Patented Sept. 13, 1910.

Application filed January 20, 1910. Serial No. 539,005.

*To all whom it may concern:*

Be it known that I, GEORGE W. DRULINER, a citizen of the United States, residing at Benkelman, in the county of Dundy and State of Nebraska, have invented certain new and useful Improvements in Kitchen-Cabinets; and I do declare the following to be a full, clear, and exact description of the invention, such as will enable others skilled in the art to which it appertains to make and use the same.

This invention relates to improvements in kitchen cabinets.

One object of the invention is to provide a kitchen cabinet adapted to contain flour or similar material and having means whereby the flour may be sifted before being removed from its receptacle in the cabinet.

Another object is to provide a device of this character having means for removably holding a plurality of small receptacles adapted to contain spices and the like.

With the foregoing and other objects in view, the invention consists of certain novel features of construction, combination and arrangement of parts as will be more fully described and particularly pointed out in the appended claims.

In the accompanying drawings, Figure 1 is a perspective view of a cabinet constructed in accordance with the invention; Fig. 2 is a central vertical sectional view; Fig. 3 is a similar view taken at right angles to Fig. 2; Fig. 4 is a horizontal section taken immediately above the spice can, tray or holder.

In the embodiment of the invention, I provide a casing 1 of cylindrical form and of suitable size and in the upper portion of the casing is formed a receptacle 2 adapted to contain flour or similar material. The upper end of the casing and the receptacle 2 are closed by a removable cover 3. The lower end of the receptacle 2 is provided with a tapered or hopper bottom 4, to the lower end of which is secured a sifter casing 5.

The sifter casing 5 is provided with a concave screen or sifter bottom 6 and in the casing above the bottom 6 is revolubly mounted a suitable agitator 7, the latter being here shown and preferably consists of a series of curved rods connected at their opposite ends to a tubular shaft 8, through which and through the opposite sides of the casing 5 is inserted a crank shaft 9, one end of which extends through the side of the casing 1 and is provided with a crank handle 10.

In the inner portion of the crank handle 9 is formed a key-way, or groove 11 with which is engaged a key or feather 12, formed in the tubular shaft 8 of the agitator. By means of the groove or key-way 11 in the crank shaft 9, and the key 12 in the tubular shaft of the agitator, the latter is locked to the crank shaft and turned thereby to force the flour through the screen bottom of the sifter casing.

In order to hold the crank shaft 9 in position in the cabinet, said shaft has formed therein, adjacent to the outer side of the casing 1, an annular groove 13 to receive a bifurcated plate 14 secured to the outer side of the casing 1 with its bifurcated end in engagement with the groove 13, thereby preventing any lateral movement of the shaft 9 in either direction.

In the lower portion of the casing 1 below the sifter is arranged a drawer 15 into which the flour is sifted and by means of which the sifted flour is removed from the cabinet. On the inner side of the casing 1 below the hopper bottom 4 of the flour receptacle is arranged a series of radial inwardly projecting brackets 16, in the outer ends of which are revolubly mounted rollers 17, upon which is supported a circular tray 18 having a centrally disposed passage 19 through which the sifter casing 5 projects.
In the upper side of the tray 18 is formed a series of radially disposed depressions 20, which are preferably of semi-cylindrical form and which are adapted to receive and support a series of cans or other receptacles 21 adapted to contain spices or similar material.

In the front side of the casing 1 above the drawer 15 is formed an opening 22, which is here shown and is preferably of circular form. The opening 22 is arranged in line with the depressions 20 in the tray 18, whereby when the tray is revolved on the rollers 17 of the supporting brackets 16 and around the sifter casing 5, the cans in the recesses 20 may be successively brought opposite to the opening 22 and the desired can removed therethrough from the tray. The tray is readily moved to bring the desired can opposite the opening by engaging the side of the tray through the opening, as will be readily understood.

The cans 21 are preferably provided on one end with removable covers and, after the desired quantity of the contents have been removed from the cans, they may be replaced in their respective depressions in the tray through the opening 22, said tray thus forming an efficient receptacle for holding the cans in convenient position for use.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

The herein described kitchen cabinet comprising a cylindrical casing formed in its side with an opening, a funnel-shaped hopper bottom secured in the casing to form a receptacle, said hopper bottom having a depending cylindrical tubular extension arranged concentric with the wall of the casing and opposite the opening in the latter, an annular series of brackets secured to the inner wall of the casing, anti-friction rollers journaled in said brackets, a circular tray supported for rotary movement on said rollers and formed with a central opening to receive the cylindrical extension on the hopper bottom, said tray being formed in its top with an annular series of radially extending semi-circular recesses opening through the periphery of said tray and adapted to be brought into register with the opening in said wall of the casing, and a series of horizontally disposed cans arranged lengthwise in the radial recesses in said tray and adapted to have their outer ends brought successively opposite the opening in the casing to permit of the removal of the desired can through said opening.

In testimony whereof I have hereunto set my hand in presence of two subscribing witnesses.

GEORGE W. DRULINER.

Witnesses:
J. HARRY DRULINER,
LEONA I. LATHAM.